(12) United States Patent
Flore et al.

(10) Patent No.: US 8,391,906 B2
(45) Date of Patent: Mar. 5, 2013

(54) BASING NEIGHBOR LIST UPDATES ON A RADIO LINK FAILURE

(75) Inventors: Oronzo Flore, Ostuni (IT); Francesco Grilli, La Jolla, CA (US); Etienne F. Chaponniere, Rome (IT); Masato Kitazoe, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 1021 days.

(21) Appl. No.: 12/267,331

(22) Filed: Nov. 7, 2008

(65) Prior Publication Data

US 2009/0137265 A1 May 28, 2009

Related U.S. Application Data

(60) Provisional application No. 60/988,642, filed on Nov. 16, 2007.

(51) Int. Cl.
*H04B 7/00* (2006.01)

(52) U.S. Cl. ............... 455/515; 455/67.11; 455/434; 455/462

(58) Field of Classification Search ............ 455/422.1, 455/423, 436, 452.1, 8, 9, 525, 67.11, 515, 455/524, 434, 445, 446, 453, 462; 370/351, 370/389
See application file for complete search history.

(56) References Cited

U.S. PATENT DOCUMENTS

| 7,327,683 | B2 | 2/2008 | Ogier et al. |
|---|---|---|---|
| 2002/0039901 | A1 | 4/2002 | Sugimoto |
| 2003/0017942 | A1 | 1/2003 | Spivey et al. |
| 2003/0179742 | A1* | 9/2003 | Ogier et al. ............ 370/351 |
| 2006/0052106 | A1 | 3/2006 | Park |
| 2006/0194579 | A1 | 8/2006 | Leung et al. |
| 2007/0086388 | A1 | 4/2007 | Kang et al. |
| 2008/0146232 | A1 | 6/2008 | Knisely |

FOREIGN PATENT DOCUMENTS

| EP | 0 898 438 | | 2/1999 |
|---|---|---|---|
| JP | 9284828 | A | 10/1997 |
| JP | 2002112310 | A | 4/2002 |
| JP | 2006238451 | A | 9/2006 |
| RU | 2267223 | | 12/2005 |
| WO | WO0149061 | | 7/2001 |

OTHER PUBLICATIONS

International Search Report & Written Opinion—PCT/US2008/083108, International Search Authority—European Patent Office—Feb. 6, 2009.
"Introduction of automatic neighbour relation function", 3GPP TSG RAN WG3 Meeting #57bis, R3-072014, Oct. 8-11, 2007, Sophia Antipolis, France.
"Inter-RAT/frequency Automatic Neighbour Relation Function", 3GPP TSG-RAN WG3 Meeting #58, R3-072117, Nov. 5-9, 2007 Jeju Island, Korea.

(Continued)

*Primary Examiner* — John J Lee
(74) *Attorney, Agent, or Firm* — Kam T. Tam

(57) ABSTRACT

Aspects relate to allowing a mobile device to discover missing neighbor cell relations when there is a radio link failure. At substantially the same time as connecting to a new cell that utilizes the same radio link technology, the failure is reported. If a connection is reestablished with a cell that utilizes a different radio link technology, the radio link failure information (and related missing neighbor information) is retained and reported later when a connection with a cell that utilizes the same radio link technology is established.

29 Claims, 13 Drawing Sheets

OTHER PUBLICATIONS

"Automatic Neighbour Cell List Configuration—required Measurement and Signalling support, Templates according to R3-071730", 3GPP TSG-RAN WG3 Meeting #57bis, R3-071936, Oct. 8-11, 2007, Sophia Antipolis, France.

"Options for Discovery of Inter-Frequency and Inter-RAT Neighbours", 3GPP TSG-RAN WG3 Meeting #58, R3-072288, Jeju, Korea, Nov. 5-9, 2007.

Taiwan Search Report—TW097144253—TIPO—Aug. 2, 2012.

* cited by examiner

BASING NEIGHBOR LIST UPDATES ON A RADIO LINK FAILURE

CROSS-REFERENCE

This application claims the benefit of U.S. Provisional Application Ser. No. 60/988,642, filed Nov. 16, 2007, entitled "APPARATUS AND METHOD FOR BASING NEIGHBOR LIST OPTIMIZATION ON A RADIO LINK FAILURE," and assigned to the assignee hereof and the entirety of which is incorporated herein by reference.

BACKGROUND

I. Field

The following description relates generally to wireless communications and more particularly to updating access node neighbor lists in a wireless communications network.

II. Background

Wireless communication systems are widely deployed to provide various types of communication and to communicate information regardless of where a user is located (e.g., inside or outside a structure) and whether a user is stationary or moving (e.g., in a vehicle, walking). For example, voice, data, video and so forth can be provided through wireless communication systems. A typical wireless communication system, or network, can by multiple-access systems capable of supporting communication with multiple users by sharing the available system resources (e.g., bandwidth and transmit power). A system can use a variety of multiple access techniques such as Frequency Division Multiplexing (FDM), Time Division Multiplexing (TDM), Code Division Multiplexing (CDM), Orthogonal Frequency Division Multiplexing (OFDM), 3GPP Long Term Evolution (LTE), and others.

Generally, a wireless multiple-access communication system can simultaneously support communication for multiple wireless terminals. Each terminal communicates with one or more base stations through transmissions on the forward and reverse links. The forward link (or downlink) refers to the communication link from the base stations to the terminals, and the reverse link (or uplink) refers to the communication link from the terminals to the base stations. This communication link can be established through a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas can be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) through utilization of the additional dimensionalities created by the multiple transmit and receive antennas.

A MIMO system supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Communication systems can include a multitude of access nodes through which end nodes (e.g., mobile devices) are coupled to a network. End nodes typically communicate with access nodes (e.g., access router) directly through established connections. Such communication systems rely on a bidirectional communications link between the end node and the access node to support two-way communication between the nodes. Access nodes that are serving neighboring geographic cells might be known to each other through manual configuration during which various parameters are configured in an access node corresponding to several of its neighbors. Such configuration can be labor intensive and error prone due to human error and the fact that the network layout of a wireless network can change due to network expansion, gradual phased deployment of a system, environmental conditions, as well as other factors.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more features and corresponding disclosure thereof, various aspects are described in connection with dynamically updating neighbor lists in an access node based on radio link failures. In situations where a mobile device quickly reestablishes a connection with an access node after a radio link failure, there is a high probability that there is a missing neighbor relationship between the access node with which communication was lost and the access node with which communication was reestablished.

An aspect relates to a method for facilitating a neighbor list update on an access node based on a radio link failure. The method includes detecting a radio link failure with a first access node, wherein the radio link failure indicates a missing neighbor relation and starting a timer. The method also includes establishing a second link with a second access node before expiration of the timer and notifying the second access node of the missing neighbor relation.

Another aspect relates to a wireless communications apparatus that includes a memory and a processor. The memory retains instructions related to detecting a radio link failure with a first access node and starting a timer. The memory also retains instructions related to establishing a second link with a second access node before expiration of the timer and notifying the second access node of the missing neighbor relation. The radio link failure indicates a missing neighbor relation. The processor is coupled to the memory and is configured to execute the instructions retained in the memory.

Another aspect relates to a wireless communications apparatus that enables a neighbor list update on an access node as a function of a radio link failure. The apparatus includes means for detecting a radio link failure with a first access node. The radio link failure indicates a missing neighbor relation. The apparatus also includes means for starting a timer and means for establishing a second link with a second access node before expiration of the timer. Further, apparatus includes means for notifying the second access node of the missing neighbor relation.

Yet another aspect relates to a computer program product that includes a computer-readable medium. The computer-readable medium includes a first set of codes for causing a computer to detect a radio link failure with a first access node.

The radio link failure indicates a missing neighbor relation. The computer-readable medium also includes a second set of codes for causing the computer to activate a timer and a third set of codes for causing the computer to establish a second link with a second access node before expiration of the timer. Also included in the computer-readable medium is a fourth set of codes for causing the computer to notify the second access node of the missing neighbor relation.

A further aspect relates to at least one processor configured to enable updates to an access node neighbor list based on radio link failures. The processor includes a first module for detecting a radio link failure with a first access node. The radio link failure indicates a missing neighbor relation. The processor also includes a second module for starting a timer and a third module for establishing a second link with a second access node before expiration of the timer. A fourth module for notifying the second access node of the missing neighbor relation is also included in processor.

Still another aspect relates to a method for facilitating updates to neighbor lists in an access node as a function of a radio link failure. The method includes establishing a radio link with an end node. The method also includes receiving from the end node missing neighbor relationship information that is a function of a radio link failure between the end node and a first access node. Further, method includes reporting to a network entity the radio link failure information.

Yet another aspect relates to a wireless communications apparatus that includes a memory and a processor. The memory retains instructions related to establishing a radio link with an end node and receiving from the end node missing neighbor relationship information that is a function of a radio link failure between the end node and a first access node. The memory also retains instructions related to reporting to a network entity the radio link failure information. The processor is coupled to the memory and is configured to execute the instructions retained in the memory.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
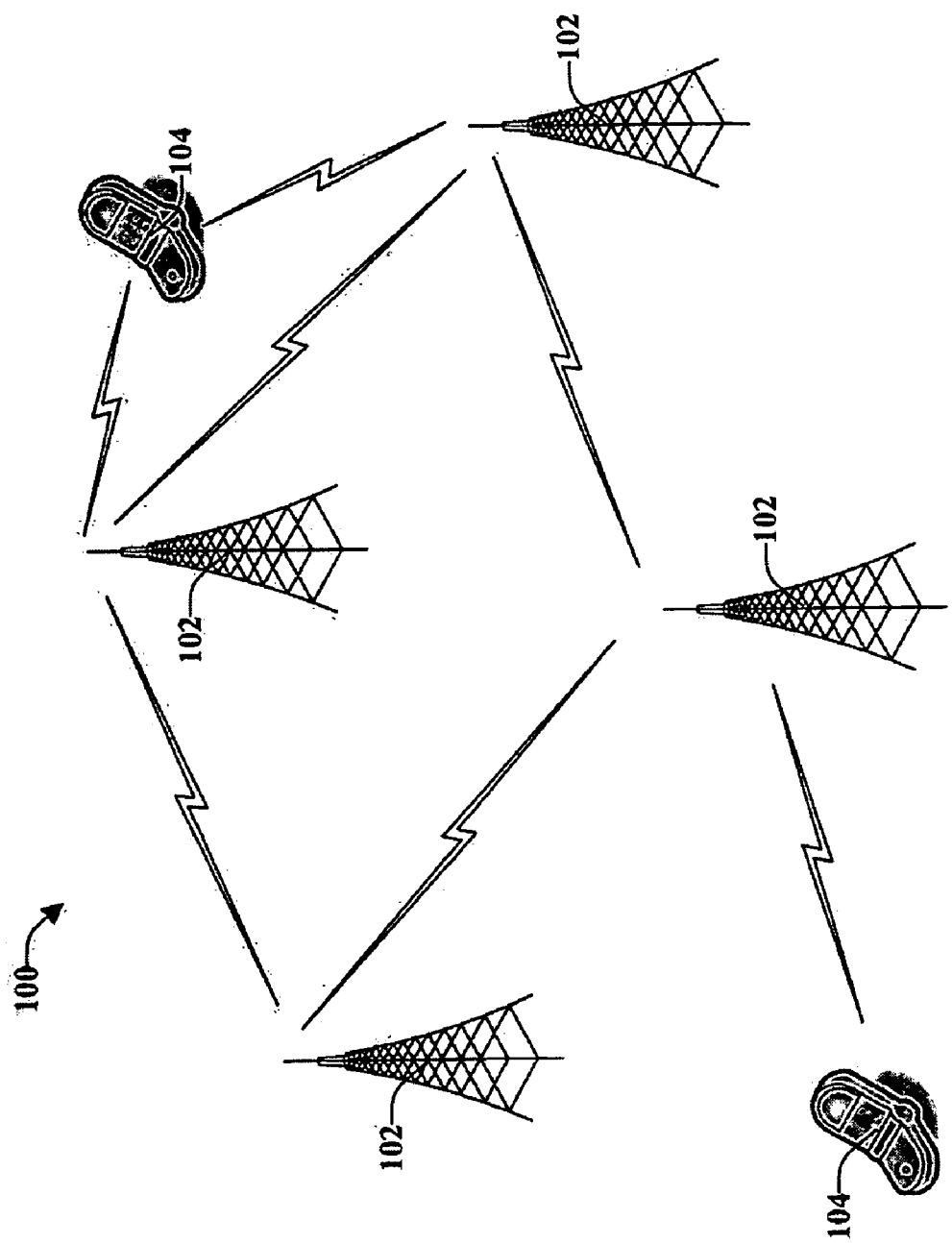
FIG. 1 illustrates a wireless communication system, according to various aspects presented herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, end node, node, device, remote station, remote terminal, access terminal user terminal, terminal, wireless communication device, wireless communication apparatus, user agent, user device, or user equipment (UE). A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, access node, node, Node B, e-NodeB, e-NB, or some other network entity.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete manner.

Referring now to FIG. 1, illustrated is a wireless communication system 100, according to various aspects presented herein. System 100 can comprise one or more base stations 102 in one or more sectors that receive, transmit, repeat, and so forth, wireless communication signals to each other and/or to one or more mobile devices 104. Each base station 102 can comprise multiple transmitter chains and receiver chains (e.g., one for each transmit and receive antenna), each of which can in turn comprise a plurality of components associated with signal transmission and reception (e.g., processors, modulators, multiplexers, demodulators, demultiplexers, antennas, and so forth). Each mobile device 104 can comprise one or more transmitter chains and receiver chains, which can be utilized for a multiple input multiple output (MIMO) system. Each transmitter and receiver chain can comprise a plurality of components associated with signal transmission and reception (e.g., processors, modulators, multiplexers, demodulators, demultiplexers, antennas, and so on), as will be appreciated by one skilled in the art.

System 100 can be configured to extract information from a radio link failure event and utilize that information for automatic updates to neighbor lists. When a mobile device loses a connection with a first base station (sometimes referred to herein as "cell" or "access node") and is able to reestablish a connection with a second base station, that reestablishment, if performed quickly enough, can be utilized to build neighbor relationships. Generally, each base station maintains a list of neighboring base stations, which can be utilized to facilitate handoff when the mobile device is to be transferred from one base station to another base station due to movement of the mobile device. If there are base stations that are not included in the neighbor list (of an access node), the missing information can impact the handoff procedure as well as other system measurements that are performed by the mobile device to establish and maintain efficient system communications.

Figure 2:
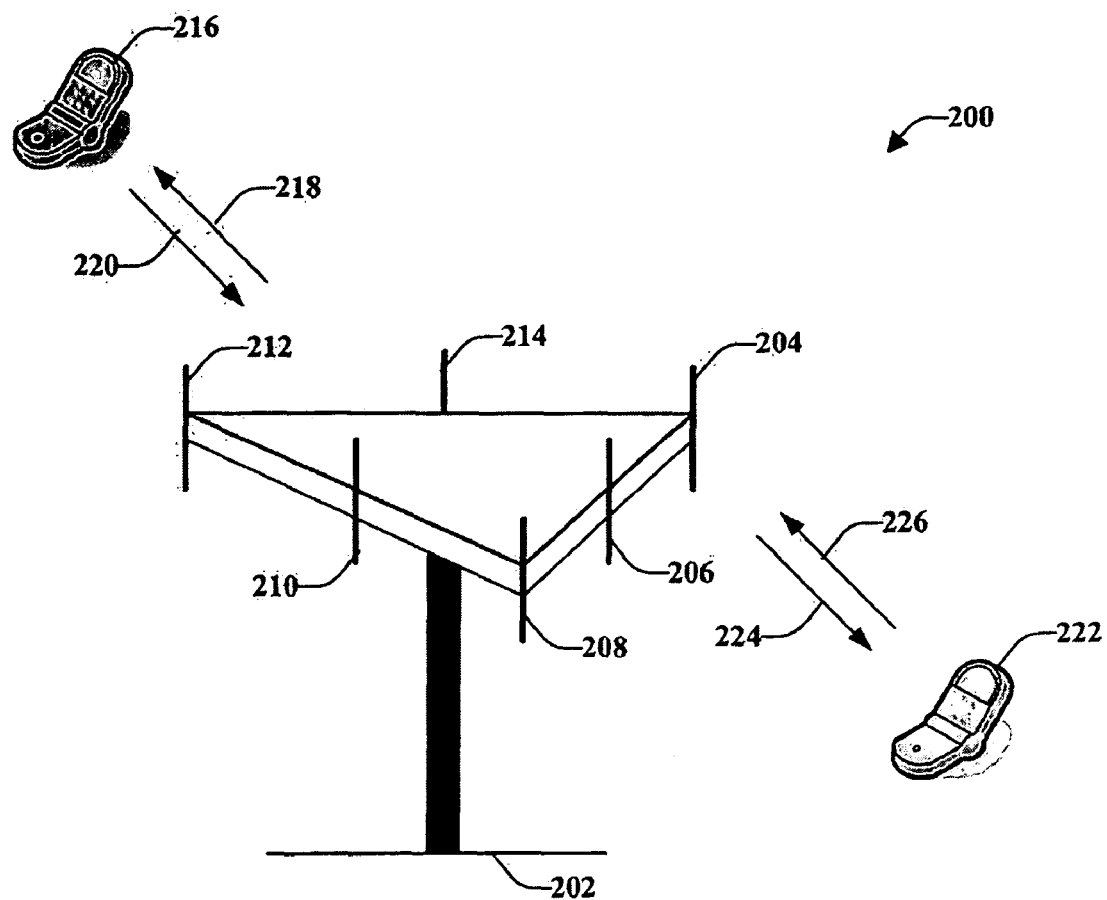
FIG. 2 illustrates a multiple access wireless communication system according to one or more aspects.

Referring now to FIG. 2, a multiple access wireless communication system 200 according to one or more aspects is illustrated. A wireless communication system 200 can include one or more base stations in contact with one or more user devices. Each base station provides coverage for a plurality of sectors. A three-sector base station 202 is illustrated that includes multiple antenna groups, one including antennas 204 and 206, another including antennas 208 and 210, and a third including antennas 212 and 214. According to the figure, only two antennas are shown for each antenna group, however, more or fewer antennas may be utilized for each antenna group. Mobile device 216 is in communication with antennas 212 and 214, where antennas 212 and 214 transmit information to mobile device 216 over forward link 218 and receive information from mobile device 216 over reverse link 220. Forward link (or downlink) refers to the communication link from the base stations to mobile devices, and the reverse link (or uplink) refers to the communication link from mobile devices to the base stations. Mobile device 222 is in communication with antennas 204 and 206, where antennas 204 and 206 transmit information to mobile device 222 over forward link 224 and receive information from mobile device 222 over reverse link 226. In a FDD system, for example, communication links 218, 220, 224, and 226 might utilize different frequencies for communication. For example, forward link 218 might use a different frequency than the frequency utilized by reverse link 220.

Each group of antennas and/or the area in which they are designated to communicate may be referred to as a sector of base station 202. In one or more aspects, antenna groups each are designed to communicate to mobile devices in a sector or the areas covered by base station 202. A base station may be a fixed station used for communicating with the terminals.

In communication over forward links 218 and 224, the transmitting antennas of base station 202 can utilize beamforming in order to improve a signal-to-noise ratio of forward links for the different mobile devices 216 and 222. Also, a base station utilizing beamforming to transmit to mobile devices scattered randomly through its coverage area might causeless interference to mobile devices in neighboring cells than the interference that can be caused by a base station transmitting through a single antenna to all the mobile devices in its coverage area.

Figure 3:
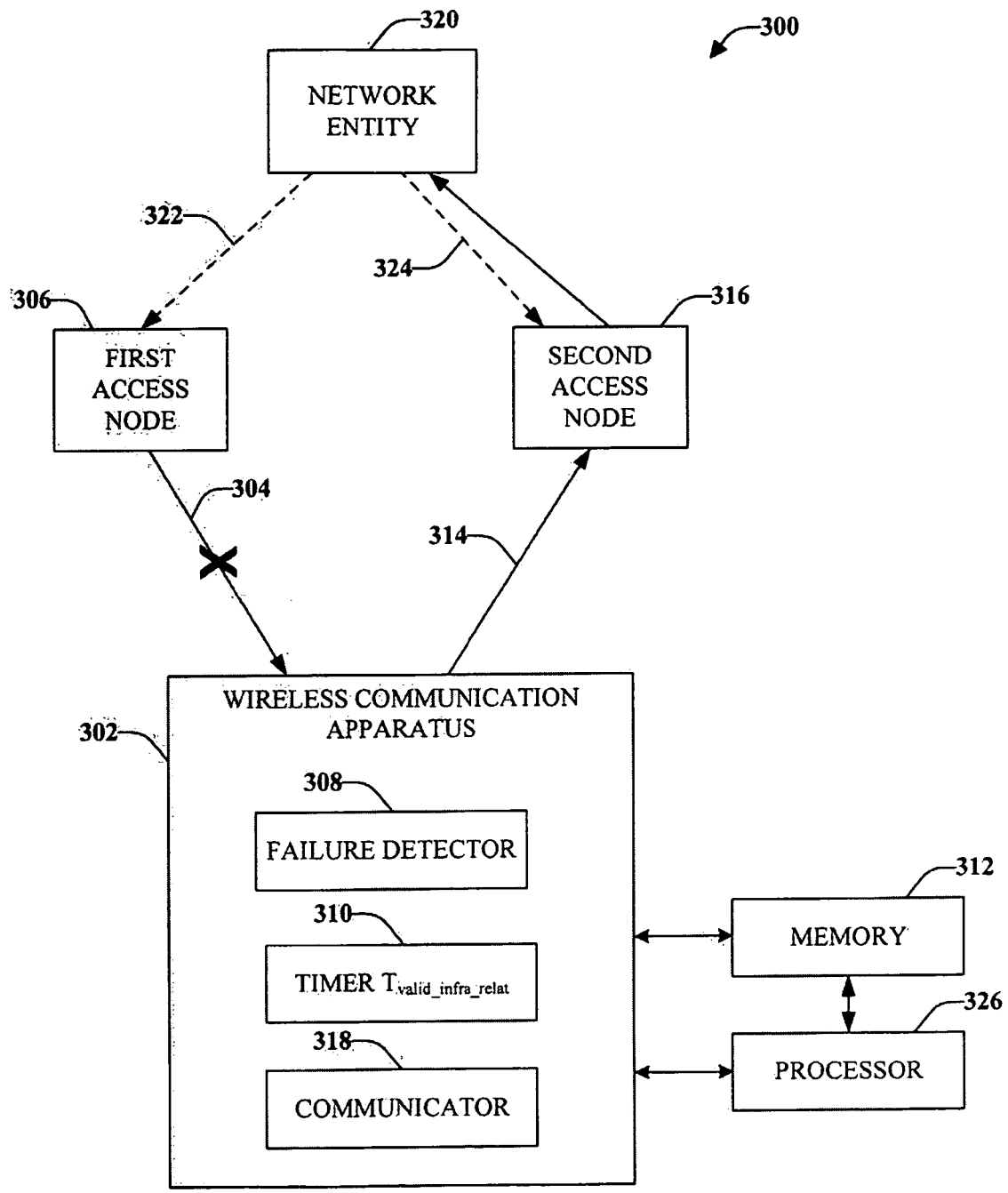
FIG. 3 illustrates a communication system that utilizes a radio link failure-based neighbor list scheme wherein neighboring cells utilize similar radio access technology, according to an aspect.

FIG. 3 illustrates a communication system 300 that utilizes a radio link failure-based neighbor list scheme wherein neighboring cells utilize similar radio access technology, according to an aspect. When there is a lost connection between a first access node (e.g., base station) and a mobile device, the mobile device attempts to reestablish a connection with a second access node. Information related to the reconnection process can be utilized by system 300 to build neighbor relationships and to enable each access nodes to maintain updated information related to neighboring access nodes, such as in a neighbor list, for example. A mobile device can utilize the neighbor list provided by an access node for measurements of the system 300 and for facilitating handovers between the access nodes. Therefore, system 300 can allow automatic building of relationships, which mitigates the need for such relationships to be configured manually and/or by various planning tools.

System 300 includes a wireless communication apparatus 302 that can communicate with various nodes (e.g., base stations, mobile devices, and so forth) within it communication network. Wireless communication apparatus 302, for example, can be an access terminal (e.g., access terminal 104 of FIG. 1, access terminal 216, 222 of FIG. 2) or the like. As illustrated, communication apparatus 302 establishes a radio link 304 with a first cell or first access node 306 (e.g., Node$_1$). A failure detector 308 can monitor the link 304 and detect a radio link failure, indicated by the "X" on the radio link 304. Upon detection of the failure, a timer $T_{valid\_infra\_relat}$ 310 is started, where wherein "T" indicates timer, "valid" indicates a validity period, "infra" indicates after radio link failure and "relat" indicates relationship. The timer $T_{valid\_infra\_relat}$ 310 has a validity range or period with a limited duration, which can be measured in seconds. Timer $T_{valid\_infra\_relat}$ 310 should have a duration long enough to allow tracking of a reconnection with a neighboring access nodes but not so long as to track a connection with non-neighboring access nodes.

Information associated with the first access node 306, such as an identity, can be retained in a storage medium associated with communication apparatus 302 (e.g., memory 312). The identity of the last serving cell before the radio link failure (e.g., first access node 306) can be retained before the radio link failure, at substantially the same time as detection of the radio link failure, when the timer 310 is started, or at a different time. At the expiration of timer $T_{valid\_infra\_relat}$ 310, the information related to the first access node 306 is discarded (e.g., no longer maintained by communication apparatus 302 or memory 312).

Communication apparatus 302 attempts to reestablish a radio link with another cell. In this illustration, communication apparatus 302 establishes a radio link 314 with a second access node 316 (e.g., $Node_2$). Communication apparatus 302 determines if the radio link 314 was established before expiration of the timer $T_{valid\_infra\_relat}$ 310. If the link 314 was established before timer $T_{valid\_infra\_relat}$ 310 timed out, communication apparatus 302 determines if the second access node 316 utilizes the same radio access technology as the first access node 306. If both nodes 306 and 316 utilize the same radio access technology, a communicator 318 reports to the new cell (e.g., second access node 316) the stored identity of the last serving cell (e.g., first access node 306). Information related to when the nodes 306 and 316 utilize different radio access technology will be discussed with reference to FIG. 4 below.

Second access node 316 can report to a network 320 entity (e.g., an operation and maintenance entity) the information about the missing neighbor relation between the first access node 306 and the second access node 316 (e.g., missing $Node_1 \rightarrow Node_2$ neighbor relation). The network 320 can selectively update the neighbor lists of first access node 306 and/or second access node 316, illustrated at 322 and 324.

System 300 can include memory 312 operatively coupled to communication apparatus 302. Memory 312 can be external to communication apparatus 302 or can reside within communication apparatus 302. Memory 312 can store information related to obtaining and reporting information related to a radio link failure if a radio link was successfully established within a certain interval (e.g., within the validity period of Timer $T_{valid\_infra\_relat}$ 310). Memory 312 can also store other suitable information related to signals transmitted and received in system 300. Memory 312 can store protocols associated with radio link failure, taking action to control communication between communication apparatus 302 and nodes 306, 316, such that system 300 can employ stored protocols and/or algorithms to achieve improved communications in a wireless network as described herein.

It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

A processor 326 can be operatively connected to communication apparatus 302 (and/or memory 312) to facilitate analysis of information related to utilization of radio link failure information in a communication network. Processor 326 can be a processor dedicated to analyzing and/or generating information received by communication apparatus 302, a processor that controls one or more components of system 300, and/or a processor that both analyzes and generates information received by communication apparatus 302 and controls one or more components of system 300.

Figure 4:
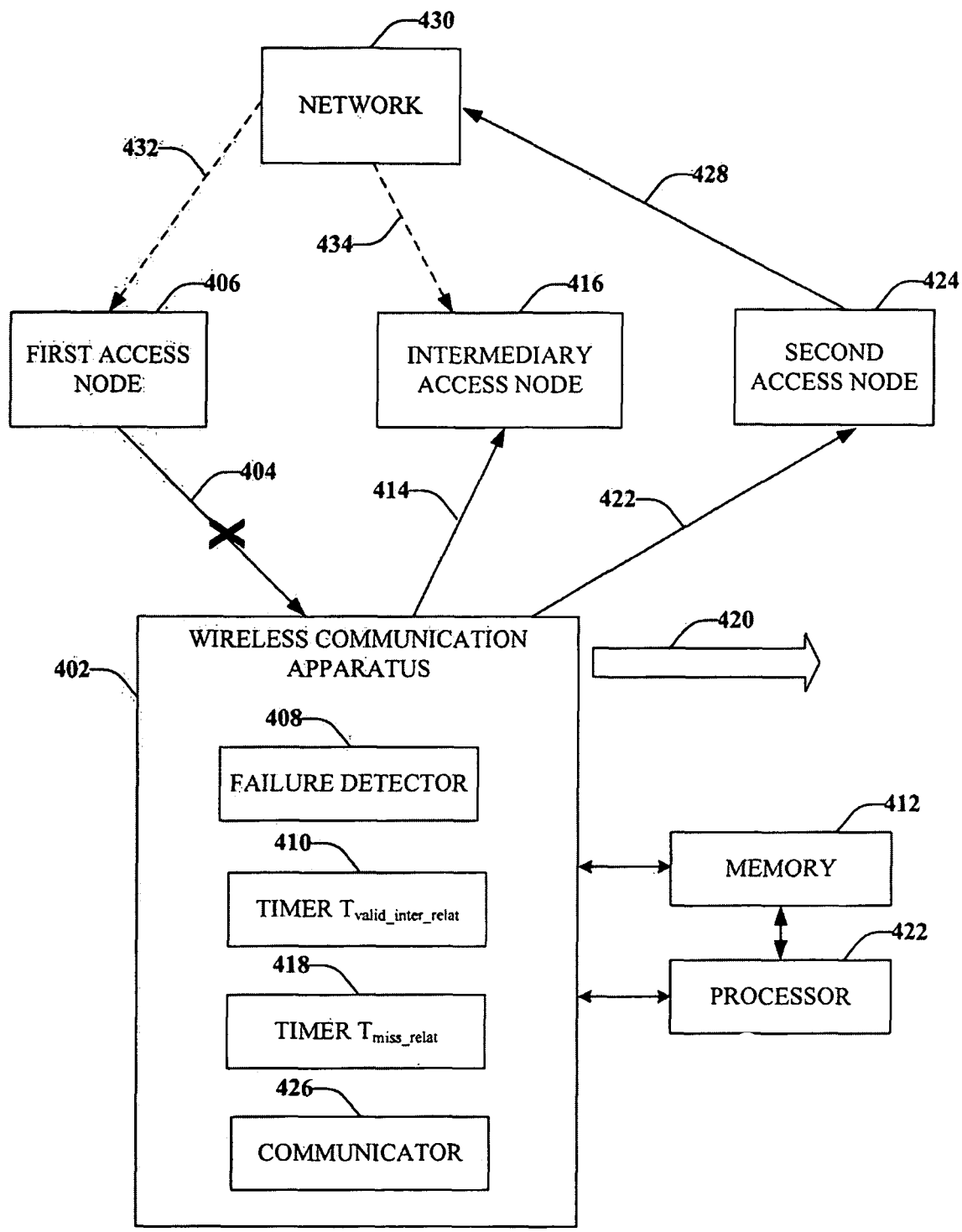
FIG. 4 illustrates a communication system that utilizes a radio link failure-based neighbor list scheme in an inter-radio access technology situation, according to an aspect.

FIG. 4 illustrates a communication system 400 that utilizes a radio link failure-based neighbor list scheme in an inter-radio access technology situation, according to an aspect. System 400 includes a wireless communication apparatus 402 that can communicate with various nodes (e.g., base stations, mobile devices and so forth) within a communication network. Wireless communication apparatus 402 can be an access terminal (e.g., access terminal 104 of FIG. 1, access terminal 216, 222 of FIG. 2) or the like.

As illustrated, communication apparatus 402 establishes a radio link 404 with a first cell or first access node 406 (e.g., $Node_1$). The first access node 406 can utilize a first radio access technology (e.g., LTE). A failure detector 408 can monitor the link 404 and detect a failure, indicated by the "X" on the radio link 404. Upon detection of the failure, a timer $T_{valid\_inter\_relat}$ 410 is started, where "T" indicates timer, "valid" indicates a validity period, "inter" indicates inter-radio access technology and "relat" indicates relationship. Timer $T_{valid\_inter\_relat}$ 410 has a validity period that can have a limited duration, which can be measured in seconds. Timer $T_{valid\_inter\_relat}$ 410 should have a duration long enough to allow a reconnection with a neighboring access node within the validity range of Timer $T_{valid\_inter\_relat}$ 410 but not so long as to make a connection with non-neighboring access nodes with the validity range of Timer $T_{valid\_inter\_relat}$ 410.

Information associated with the first access node 406, such as an identity, can be retained in a storage medium associated with communication apparatus 402 (e.g., memory 412). The identity of the last serving cell before the radio link failure (e.g., first access node 406) can be retained before the radio link failure, at substantially the same time as detection of the radio link failure, when the Timer $T_{valid\_inter\_relat}$ 410 is started, or at a different time, provided this information has been captured by communication apparatus 402. At the expiration of Timer $T_{valid\_inter\_relat}$ 410, the information related to the first access node 406 is discarded.

Communication apparatus 402 can declare it is going out of service (OOS) and then re-enter the service area in a different radio access technology/frequency. If communication apparatus 402 re-enters the service area in a different cell (e.g., WCDMA) a radio link 414 with an intermediary access node 416 (e.g., $Node_{int}$) can be established. The intermediary access node 416 utilizes a different radio access technology than the radio access technology utilized by first access node 406. If the radio link 414 with intermediary access node 416 is established within the validity period of Timer $T_{valid\_inter\_relat}$ 410 (e.g., a few seconds) a second Timer $T_{miss\_relat}$ 418 is started, where "T" indicates timer and "miss_relat" indicates a missing relationship (e.g., a different radio access technology). Timer $T_{miss\_relat}$ 418 can have a validity range that is measured in hours (e.g., two hours, nine hours, twenty-four hours, and so forth). At substantially the same time as starting Timer $T_{miss\_relat}$ 418, the missing inter-radio access technology (RAT) neighbor relationship between the first access node 406 and the intermediary access node 416 (e.g., missing $Node_1 \rightarrow Node_{int}$ inter-RAT neighbor relationship) is retained, such as in memory 412. At the expiration of Timer $T_{miss\_relat}$ 418, this information is discarded.

The communication apparatus 402 moves, indicated by arrow 420, and connects, illustrated at 422, to a second access node 424 that utilizes the same radio access technology (e.g., the same public land mobile network (PLMN)) as the first access node 406. If the connection with the second access node 424 is established before expiration of Timer $T_{miss\_relat}$ 418, a communicator 426 reports to the second access node 424 the missing first access node 406 to intermediary access node 416 inter-radio access neighbor relationship.

The second access node 424 can establish a communication link with 428 and report to a network entity 430 the missing first access node 406 to intermediary access node 416 inter-radio access neighbor relationship (e.g., missing $Node_1 \rightarrow Node_{int}$ inter-RAT neighbor relationship). The network entity 430 can selectively update the neighbor list of the first access node 406 (illustrated at 432) and/or the intermediary access node 416 (illustrated at 434).

Although missing neighbor relations should be collected in the mobile device at substantially the same time as the radio link failure, it is not necessary to report this information to the network during the re-establishment procedure (described with reference to FIG. 3) or at connection setup (described with reference to FIG. 4), which can occur in a time critical situation and can be based on messages of limited size. Thus, in accordance with some aspects, the reporting can be delayed and performed by the mobile device when radio conditions allow for such reporting.

Figure 5:
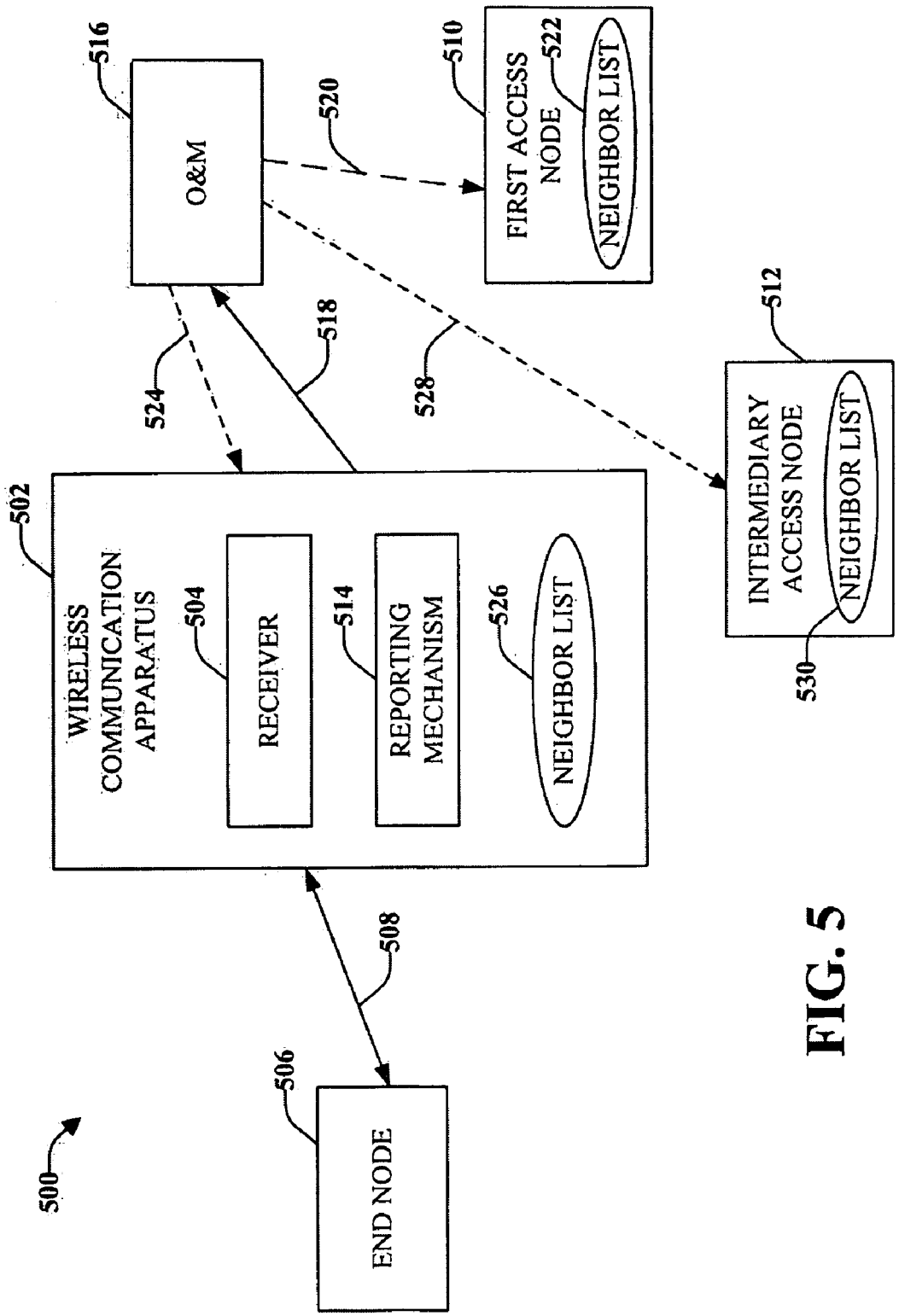
FIG. 5 illustrates a system for self-configuring access node neighbor lists based on a radio link failure.

FIG. 5 illustrates a system 500 for self-configuring access node neighbor lists based on a radio link failure. Included in system 500 is a communication apparatus 502 that can be configured to transfer data to a variety of nodes (e.g., mobile devices, base stations, operation and network entity, and so forth). Communication apparatus 502 can be an access node, such as access node 102 of FIG. 1, access node 202 of FIG. 2, and so forth).

Included in communication apparatus 502 is a receiver 504 that is configured to receive missing neighbor list information from an end node 506 (e.g., mobile device) with which a radio link 508 has been established. For example, the missing neighbor list information can be a missing relationship between a first access node 510 (e.g., $Node_1$) and communication apparatus 502 (e.g., $Node_2$). In accordance with some aspects, the missing neighbor list can be a missing relationship between first access node 510 and an intermediary access node 512 (e.g., $Node_{int}$).

At substantially the same time as receiving the notification (or at a different time), a reporting mechanism 514 communicates the missing neighbor relation (as reported by end node 506) to an operation and network entity (O&M) 516 over a communication link 518. For example, the reporting mechanism 514 can notify the O&M 516 of the missing $Node_1 \rightarrow Node_2$ neighbor relation. Based on this information, the O&M 516 can update, at 520, a neighbor list 522 of the first access node 510 with the missing $Node_1 \rightarrow Node_2$ neighbor relation. Additionally, the O&M 516 can update, over a communication link 524, a neighbor list 526 of communication apparatus 502 with the missing $Node_2 \rightarrow Node_1$ neighbor relation. In accordance with some aspects, O&M 516 can notify communication apparatus 502 about the missing relationship because, if there is a missing $Node_1 \rightarrow Node_2$ neighbor relation in first access node 510, there most likely is a missing $Node_2 \rightarrow Node_1$ neighbor relation in communication apparatus 502.

In accordance with some aspects, the information reported to the O&M 516 can be a missing first access node 510 ($Node_1$) to intermediary node 512 ($Node_{int}$) inter-radio access technology neighbor relation. The O&M 516 updates, at 520, the neighbor list 522 of first access node 510 with the missing $Node_1 \rightarrow Node_{int}$ inter-RAT neighbor relationship. According to some aspects, the O&M 516 can also update, at 528, the neighbor list 530 of intermediary access node 512 with the $Node_{int} \rightarrow Node_1$ inter-RAT neighbor relationship for symmetry reasons.

Thus, system 500 can dynamically and automatically update the neighbor lists 522, 526, or 530 of the appropriate access nodes. This automatic or self-configuring updates are an advantage over conventional systems that utilize manual techniques to populate neighbor lists and/or that utilize cumbersome planning tools.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described herein. It is to be appreciated that the functionality associated with the blocks may be implemented by software, hardware, a combination thereof or any other suitable means (e.g., device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
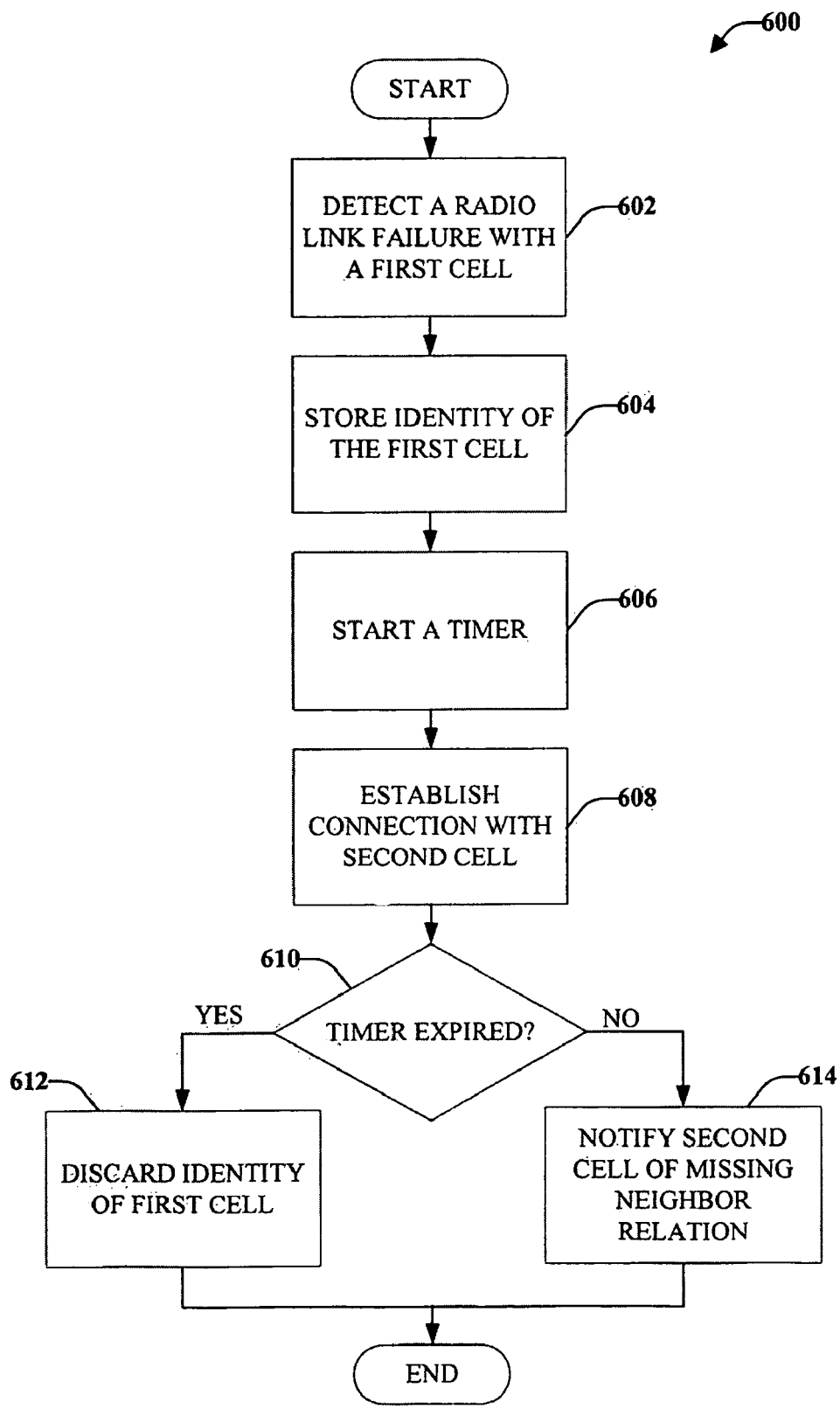
FIG. 6 illustrates a method for utilizing a radio link failure-based neighbor list for neighboring cells that utilize similar radio access technology, according to an aspect.

FIG. 6 illustrates a method 600 for utilizing a radio link failure-based neighbor list for neighboring cells that utilize similar radio access technology, according to an aspect. Method 600 relates to the situation where there is a radio link failure and a mobile device is able to re-establish a connection with a new cell of the network quickly (e.g., both cells utilize the same radio access technology). The ability to re-establish the connection quickly can indicate that there is a missing neighbor relationship between the old serving cell (where the radio link failure occurred) and the new cell (where the mobile device was able to quickly re-establish the connection).

Method 600 starts, at 602, when a radio link failure with a first cell (e.g., access node, base station, and so forth) is detected. While being served by the first cell, the identification of the first cell was known, therefore, due to the radio link failure, the identification of the first cell (e.g., last serving cell) is stored, at 604. A timer is started, at 606. The duration of the timer can be configurable and should be of a short length (e.g., a few seconds). The timer started, at 606, can be referred to as $T_{valid\_infra\_relat}$, where the timer (T) is valid for a relationship between (infra) cells having a common relationship ("relat"), since the cells are in the same network and utilizing the same radio access technology.

At 608, a connection with a second cell is established and a determination is made, at 610, whether the connection was reestablished before expiration of the timer ($T_{valid\_infra\_relat}$).

If the connection was not reestablished before expiration of the timer ("YES"), the identity of the first cell is discarded, at 612. In accordance with some aspects, the identity of the first cell can be discarded when the Timer $T_{valid\_infra\_relat}$ times out, even if a connection has not been reestablished.

If the connection was established with the second cell before expiration of the timer ("NO") the second cell is notified of the missing neighbor relation, at 614. Upon receiving this information the second cell can inform a network entity of the missing neighbor relation. The network entity can selectively notify the first cell and/or the second cell of the missing neighbor relation in order for those cell to update their respective neighbor lists.

Figure 7:
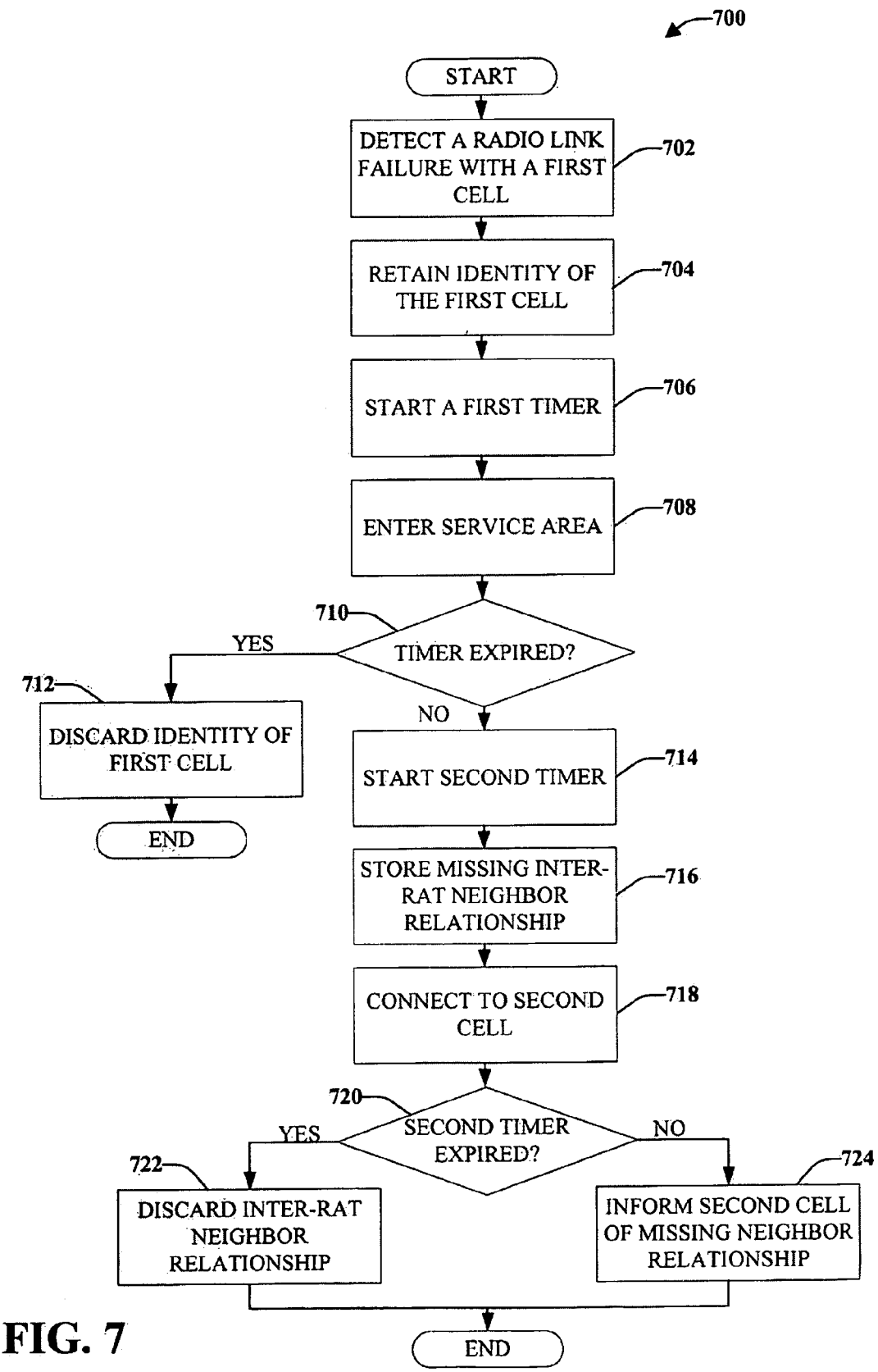
FIG. 7 illustrates a method for utilizing a radio link failure-based neighbor list scheme in an inter-radio access technology situation, according to an aspect.

FIG. 7 illustrates a method 700 for utilizing a radio link failure-based neighbor list scheme in an inter-radio access technology situation, according to an aspect. Method 700 relates to the situation where there is a radio link failure and the mobile device is able to re-establish a connection with a new cell that utilizes a different radio, access technology than the cell with which there was a radio link failure. The mobile device reports the missing neighbor relation to the network the next time there is a connection to the network. For example, this missing neighbor relation can be reported when the mobile device enters a cell that utilizes the same radio access technology as the original cell (e.g., the cell with which there was a radio link failure).

Method 700 starts, at 702, when a radio link failure is detected. The radio link failure occurs when being served by a first cell (referred to as $Node_1$). In accordance with some aspects, the first cell is an LTE cell. The identity of the first cell (e.g., last serving cell prior to the radio link failure) is retained, at 704. A timer, referred to as $T_{valid\_inter\_relat}$, is started, at 706, where "T" indicates timer, "valid" indicates a validity period, "inter" indicates inter-radio access technology and "relat" indicates relationship. Timer $T_{valid\_inter\_relat}$ eat can have a validity range that is a few seconds in length.

An out-of-service condition can be declared and a service area entered, at 708. The access node serving the entered service area is referred to herein as "intermediary access node" or $Node_{int}$. The service area entered can utilize a technology different from the technology utilized by the first cell. For example, the radio access technology utilized in the entered service area can be a WCDMA cell.

At 710, a determination is made whether the first timer $T_{valid\_inter\_relat}$ has expired (e.g., timed out). If the first timer $T_{valid\_inter\_relat}$ expired before the new service area was entered ("YES"), the identity of the first cell is discarded. If the new service area was entered before the timer timed out ("NO"), a second timer ($T_{miss\_relat}$) is started, at 714, where "T" indicate timer and "miss_relat" indicates a missing relationship (e.g., a different radio access technology). The missing $Node_1$ to $Node_{int}$ inter-RAT neighbor relationship is stored, at 716.

At 718, a connection is made to a second cell (e.g., $Node_2$) that utilizes the same radio access technology as the first cell ($Node_1$). At 720, a determination is made whether the second timer expired. If the timer expired ("YES") the inter-rat neighbor relationship is discarded, at 722. If the timer has not expired ("NO"), the missing $Node_1$ to $Node_{int}$ inter-RAT neighbor relationship is reported to the second cell. The second cell can report this information to a network entity that selectively updates the neighbor lists of the first cell and the intermediary cell.

In accordance with some aspects, the identity of the first cell can be discarded when the Timer $T_{valid\_inter\_relat}$ times out, even if this occurs prior to a connection being reestablished. Additionally or alternatively, the missing $Node_1$ to $Node_{int}$ inter-RAT neighbor relationship can be discarded when second timer $T_{miss\_relat}$ times out, even if the time out occurs prior to a connection being reestablished with a second cell that utilizes the same radio access technology as the first cell.

Figure 8:
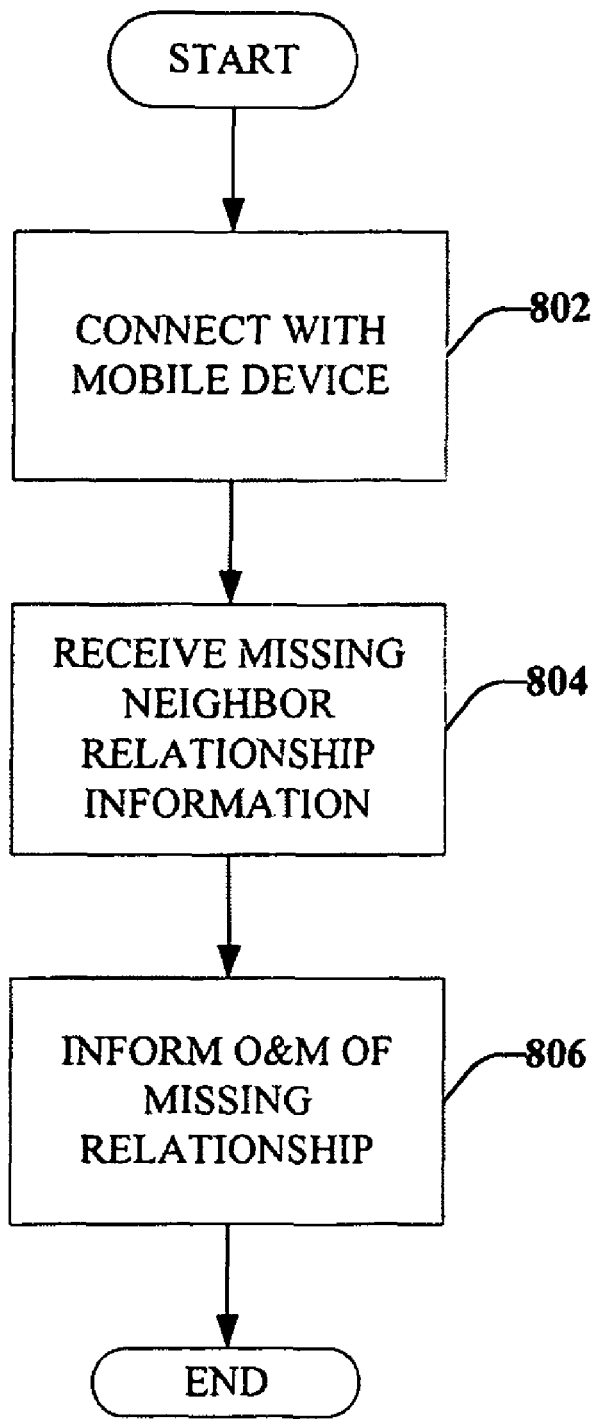
FIG. 8 illustrates a method for reporting a missing neighbor relationship in accordance with the aspects disclosed herein.

FIG. 8 illustrates a method 800 for reporting a missing neighbor relationship in accordance with the aspects disclosed herein. Method 800 can be utilized if the missing neighbor relationship is between cells that utilize the same radio access technology and/or if the missing neighbor relationship is between cells that utilize different radio access technologies (e.g., inter-RAT). Method 800 can enable that missing neighbor relations located in an access node neighbor list are updated in a self-configuring and dynamic manner.

Method 800 starts, at 802, when a connection with a mobile device is established. At 804, missing neighbor relationship information is received from the mobile device. This missing neighbor relationship information can be a missing relationship between a first cell (e.g. $Node_1$) and the cell to which the mobile device connected, at 802 (e.g., $Node_2$). In accordance with some aspects, the missing neighbor relationship information can be a missing relationship between a first cell (e.g., $Node_1$) that utilizes a first radio access technology and an intermediary cell (e.g., $Node_{int}$) that utilizes a second radio access technology.

At 806, the missing neighbor relationship is reported to a network entity. In accordance with the aspects where the missing neighbor relationship is between cells that utilize the same radio access technology, the network entity is informed of the missing $Node_1 \rightarrow Node_2$ neighbor relation. The network entity can update the neighbor list of $Node_1$ with the missing $Node_1 \rightarrow Node_2$ neighbor relation. In accordance with some aspects, the network entity can also update the neighbor list of $Node_2$ with the missing $Node_2 \rightarrow Node_1$ neighbor relation for symmetry purposes. If there is a missing $Node_1 \rightarrow Node_2$ neighbor relation in $Node_1$, it can indicate that there is a missing $Node_2 \rightarrow Node_1$ neighbor relation in $Node_2$.

In accordance with the aspects where the missing neighbor relationship is between cells that utilize different radio access technologies, the network entity is informed of the missing $Node_1 \rightarrow Node_{int}$ inter-RAT neighbor relationship. The network entity can update the neighbor list of $Node_1$ with the missing $Node_1 \rightarrow Node_{int}$ inter-RAT neighbor relationship. In accordance with some aspects, the network entity can also update the neighbor list of $Node_{int}$ with the $Node_{int} \rightarrow Node_1$ inter-RAT neighbor relationship for symmetry purposes.

Figure 9:
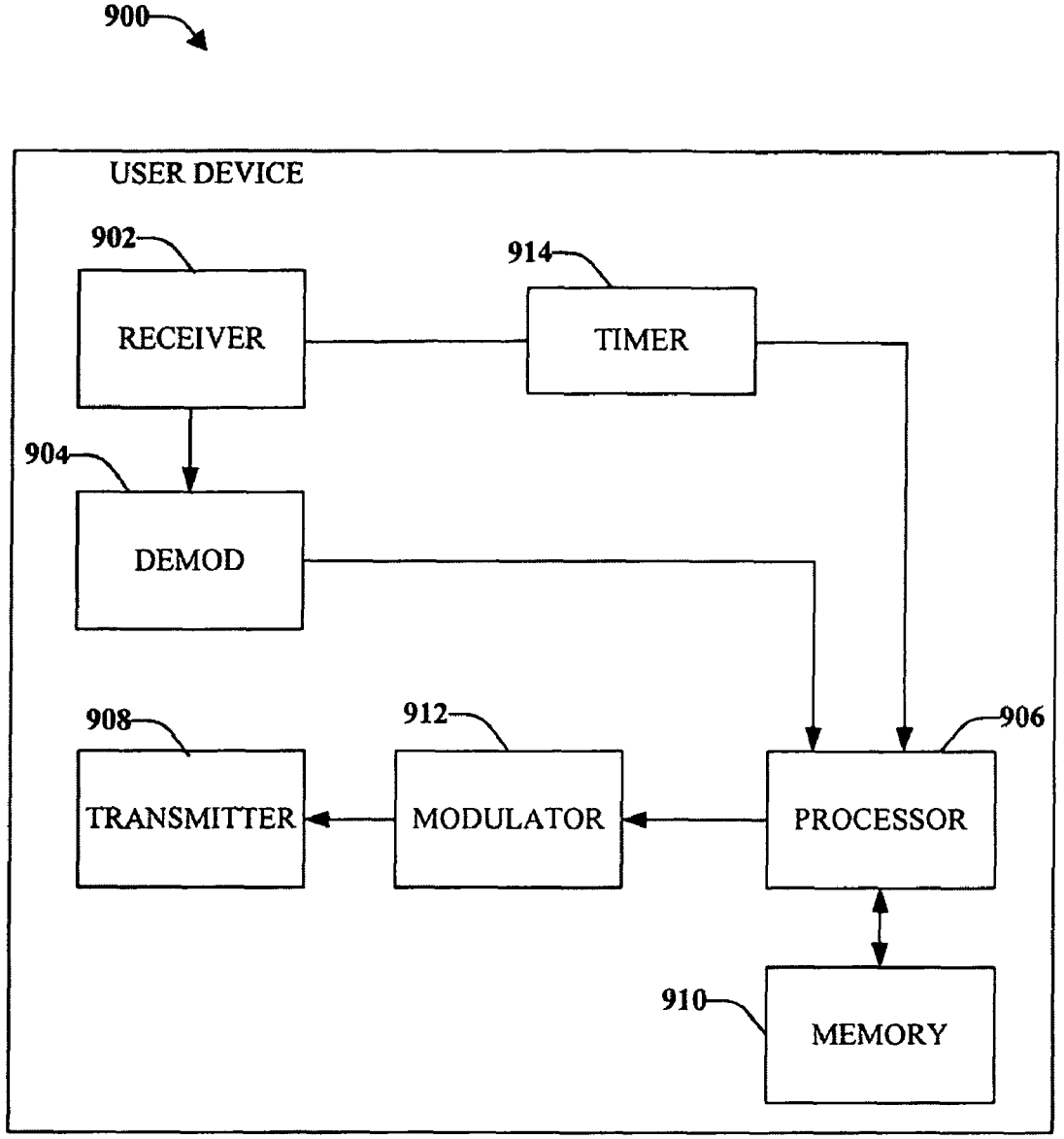
FIG. 9 illustrates a system that facilitates self-configuration of missing neighbor relations in a wireless communications network in accordance with one or more of the disclosed aspects.

With reference now to FIG. 9, illustrated is a system 900 that facilitates self-configuration of missing neighbor relations in a wireless communications network in accordance with one or more of the disclosed aspects. System 900 can reside in a user device. System 900 comprises a receiver 902 that can receive a signal from, for example, a receiver antenna. The receiver 902 can perform typical actions thereon, such as filtering, amplifying, downconverting, etc. the received signal. The receiver 902 can also digitize the conditioned signal to obtain samples. A demodulator 904 can obtain received symbols for each symbol period, as well as provide received symbols to a processor 906.

Processor 906 can be a processor dedicated to analyzing information received by receiver component 902 and/or generating information for transmission by a transmitter 908. In addition or alternatively, processor 906 can control one or more components of user device 900, analyze information received by receiver 902, generate information for transmission by transmitter 908, and/or control one or more components of user device 900. Processor 906 may include a controller component capable of coordinating communications with additional user devices.

User device 900 can additionally comprise memory 908 operatively coupled to processor 906 and that can store information related to coordinating communications and any other suitable information. Memory 910 can additionally store protocols associated with self-configuring neighbor lists. User device 900 can further comprise a symbol modulator 912 and a transmitter 908 that transmits the modulated signal.

Receiver 902 is further operatively coupled to a timer 914 that is configured to track intervals associated with the time taken to reestablish a radio link after a radio link failure. The timer 914 can track different time intervals depending on whether the radio link failure is between access nodes that utilize the same radio access technology or between access nodes that utilize a different radio access technology. Information associated with a missing $Node_1 \rightarrow Node_2$ neighbor relation and/or a missing $Node_1$ to $Node_{int}$ inter-RAT neighbor relationship can be retained in memory 910. Based on the condition of the timer(s), the $Node_1 \rightarrow Node_2$ neighbor relation and/or the missing $Node_1$ to $Node_{int}$ inter-RAT neighbor relationship can be conveyed to an access node by transmitter 908.

Figure 10:
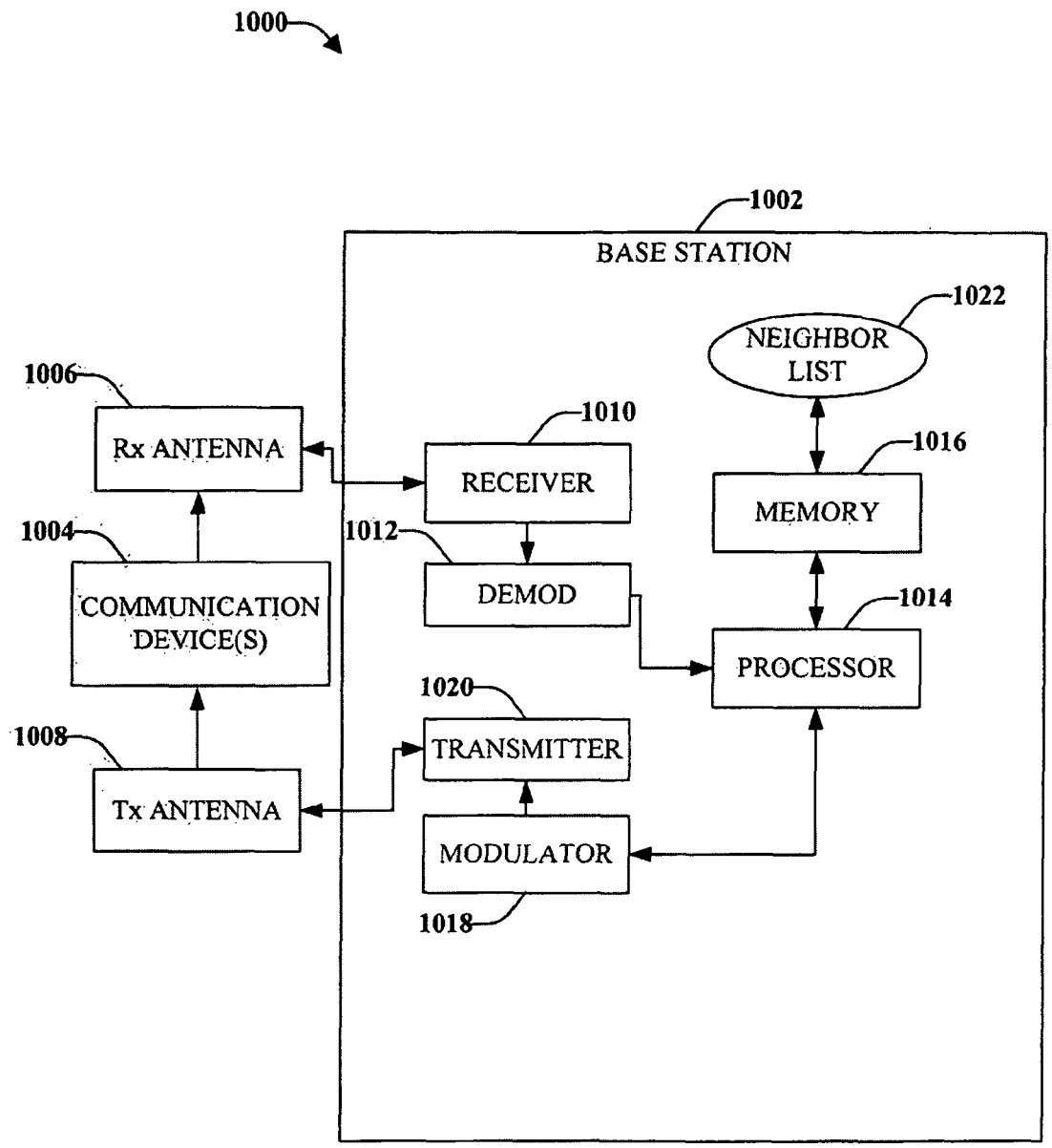
FIG. 10 illustrations a system that facilitates basing neighbor list updates on a radio link failure in accordance with various aspects presented herein.

FIG. 10 illustrations a system 1000 that facilitates basing neighbor list updates on a radio link failures in accordance with various aspects presented herein. System 1000 comprises a base station or access point 1002. As illustrated, base station 1002 receives signal(s) from one or more communication devices 1004 (e.g., user device) by a receive antenna 1006, and transmits to the one or more communication devices 1004 through a transmit antenna 1008.

Base station 1002 comprises a receiver 1010 that receives information from receive antenna 1006 and is operatively associated with a demodulator 1012 that demodulates received information. Demodulated symbols are analyzed by a processor 1014 that is coupled to a memory 1016 that stores information related to dynamically updating neighbor lists in neighboring cells that have a missing neighbor relationship. A modulator 1018 can multiplex the signal for transmission by a transmitter 1020 through transmit antenna 1008 to communication devices 1004.

Receiver 1010 can obtain information from a user device that indicates a missing $Node_1 \rightarrow Node_2$ neighbor relation and/or a missing $Node_1$ to $Node_{int}$ inter-RAT neighbor relationship. Transmitter 1020 can convey this information to a network entity. The network entity can selectively update a neighbor list 1022 of base station 1002 as a function of the missing neighbor relationship information.

Figure 11:
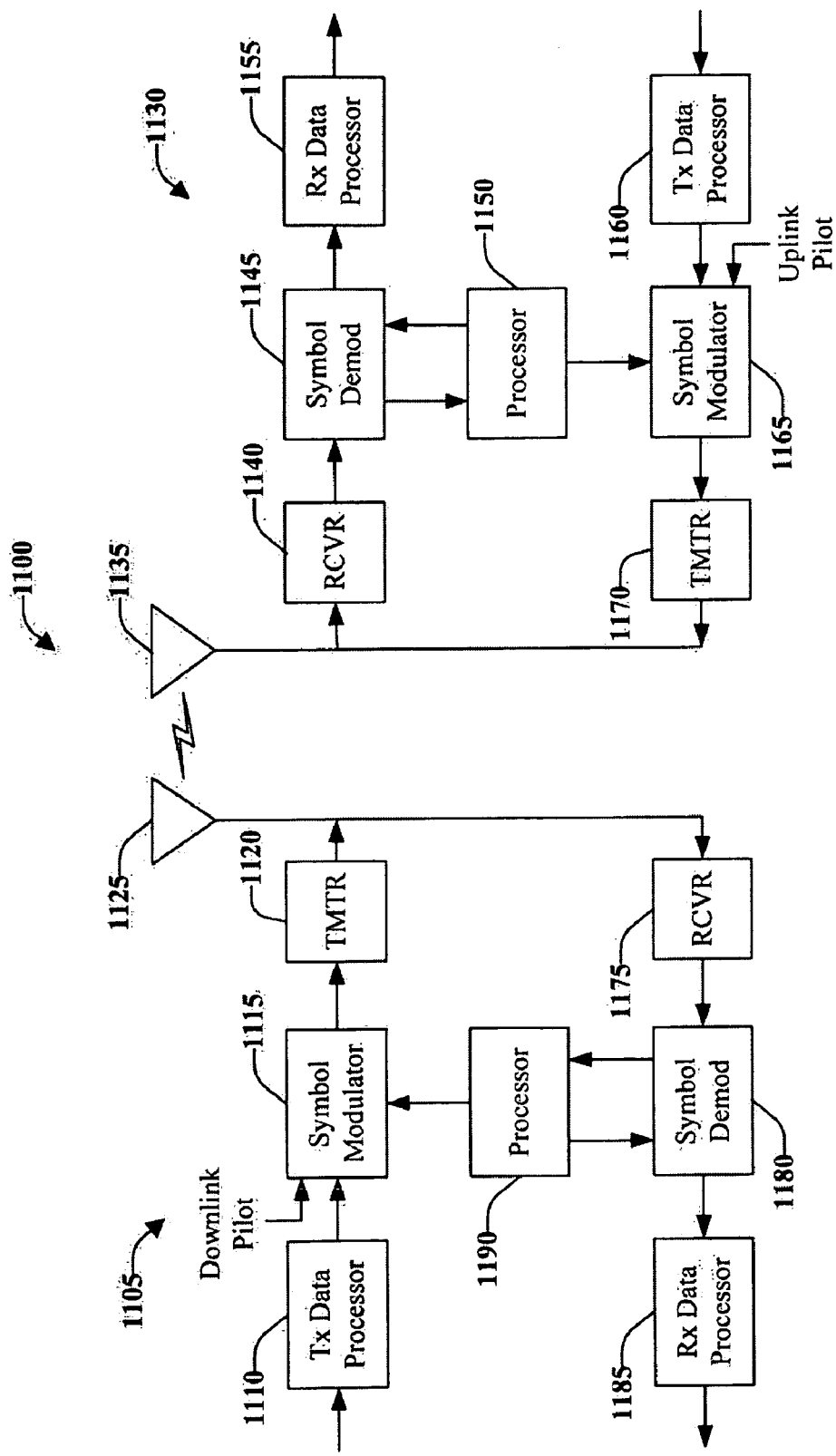
FIG. 11 illustrates an exemplary wireless communication system, according to various aspects.

FIG. 11 illustrates an exemplary wireless communication system 1100, according to various aspects. Wireless communication system 1100 depicts one base station and one terminal for sake of brevity. However, it is to be appreciated that system 1100 can include more than one base station or access point and/or more than one terminal or user device, wherein additional base stations and/or terminals can be substantially similar or different from the exemplary base station and terminal described below. In addition, it is to be appreciated that the base station and/or the terminal can employ the systems and/or methods described herein to facilitate wireless communication there between.

Referring now to FIG. 11, on a downlink, at access point 1105, a transmit (TX) data processor 1110 receives, formats, codes, interleaves, and modulates (or symbol maps) traffic data and provides modulation symbols ("data symbols"). A symbol modulator 1115 receives and processes the data symbols and pilot symbols and provides a stream of symbols. A symbol modulator 1115 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1120 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1125 to the terminals. At terminal 1130, an antenna 1135 receives the downlink signal and provides a received signal to a receiver unit (RCVR) 1140. Receiver unit 1140 conditions (e.g., filters, amplifies, and frequency downconverts) the received signal and digitizes the conditioned signal to obtain samples. A symbol demodulator 1145 obtains N received symbols and provides received pilot symbols to a processor 1150 for channel estimation. Symbol demodulator 1145 further receives a frequency response estimate for the downlink from processor 1150, performs data demodulation on the received data symbols to obtain data symbol estimates (which are estimates of the transmitted data symbols), and provides the data symbol estimates to an RX data processor 1155, which demodulates (i.e., symbol demaps), deinterleaves, and decodes the data symbol estimates to recover the transmitted traffic data. The processing by symbol demodulator 1145 and RX data processor 1155 is complementary to the processing by symbol modulator 1115 and TX data processor 1110, respectively, at access point 1105.

On the uplink, a TX data processor 1160 processes traffic data and provides data symbols. A symbol modulator 1165 receives and multiplexes the data symbols with pilot symbols, performs modulation, and provides a stream of symbols. A transmitter unit 1170 then receives and processes the stream of symbols to generate an uplink signal, which is transmitted by the antenna 1135 to the access point 1105.

At access point 1105, the uplink signal from terminal 1130 is received by the antenna 1125 and processed by a receiver unit 1175 to obtain samples. A symbol demodulator 1180 then processes the samples and provides received pilot symbols and data symbol estimates for the uplink. An RX data processor 1185 processes the data symbol estimates to recover the traffic data transmitted by terminal 1130. A processor 1190 performs channel estimation for each active terminal transmitting on the uplink.

Processors 1190 and 1150 direct (e.g., control, coordinate, manage, . . . ) operation at access point 1105 and terminal 1130, respectively. Respective processors 1190 and 1150 can be associated with memory units (not shown) that store program codes and data. Processors 1190 and 1150 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1190 and 1150.

Figure 12:
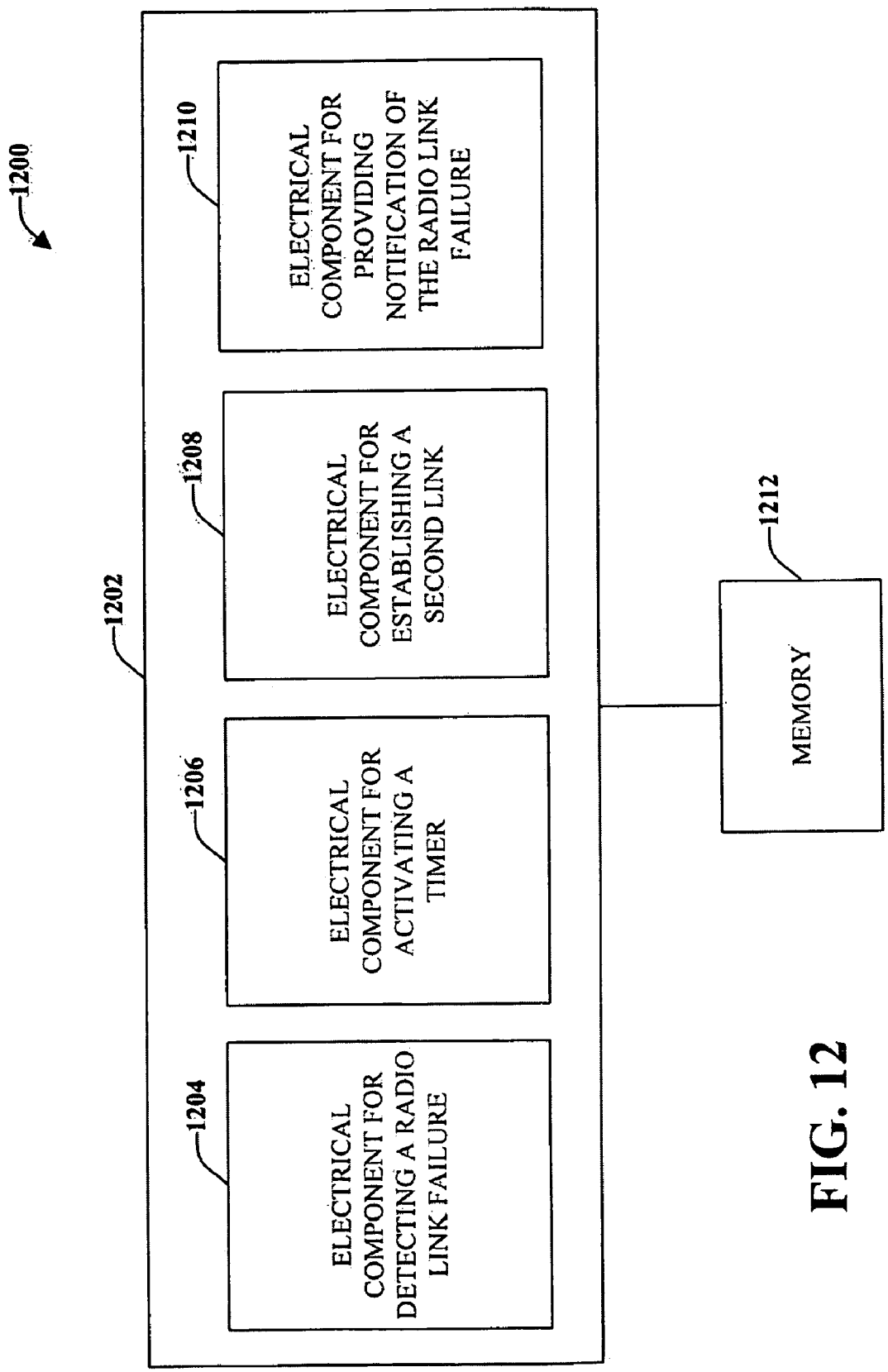
FIG. 12 illustrates an example system that facilitates a neighbor list update on an access node based on a radio link failure in accordance with an aspect.

With reference to FIG. 12, illustrated is an example system 1200 that facilitates a neighbor list update on an access node based on a radio link failure in accordance with an aspect. System 1200 can reside at least partially within a mobile device it is to be appreciated that system 1200 is represented as including functional blocks, which may be functional blocks that represent functions implemented by a processor, software, or combination thereof (e.g., firmware).

System 1200 includes a logical grouping 1202 of electrical components that can act separately or in conjunction. Logical grouping 1202 includes an electrical component 1204 for detecting a radio link failure with a first access node. The radio link failure indicates a missing neighbor relation.

Also included in logical grouping 1202 is and electrical component 1206 for activating a timer and an electrical component 1208 for establishing a second link with a second access node before expiration of the timer. Further, logical grouping 1202 includes an electrical component 1210 for notifying the second access node of the missing neighbor relation.

In accordance with some aspects, the timer is a $T_{valid\_infra\_relat}$ timer and the missing neighbor relation is between the first access node and the second access node. In this aspect, the first access node and the second access node utilize similar radio link technology.

According to some aspects, the timer is a $T_{miss\_relat}$ timer and logical grouping 1202 includes an electrical component for starting a $T_{valid\_inter\_relat}$ timer after detection of the radio link failure. Logical grouping 1202 can also include an electrical component for establishing a communication link with an intermediary access node before expiration of the $T_{valid\_inter\_relat}$ timer. The first access node and the intermediary access node utilize different radio link technology. Further, logical grouping 1202 can include an electrical component for starting the $T_{miss\_relat}$ timer, wherein the missing neighbor relation is between the first access node and the intermediary access node and the first access node and second access node utilize similar radio link technology.

Additionally or alternatively, logical grouping 1202 can include an electrical component for detecting expiration of the $T_{valid\_inter\_relat}$ timer and an electrical component for discarding information related to the radio link failure. According to an aspect, logical grouping 1202 can include an electrical component for detecting expiration of the $T_{miss\_relat}$ timer and an electrical component for discarding information related to the radio link failure.

Additionally or alternatively, logical grouping 1202 can include an electrical component for detecting expiration of the timer and an electrical component for discarding information related to the radio link failure. In an aspect, logical grouping 1202 can include an electrical component for storing an identification of the first access node before detection of the radio link failure.

System 1200 can include a memory 1212 that retains instructions for executing functions associated with electrical components 1204, 1206, 1208, and 1210 or other components. While shown as being external to memory 1212, it is to be understood that one or more of electrical components 1204, 1206, 1208, and 1210 can exist within memory 1212.

Figure 13:
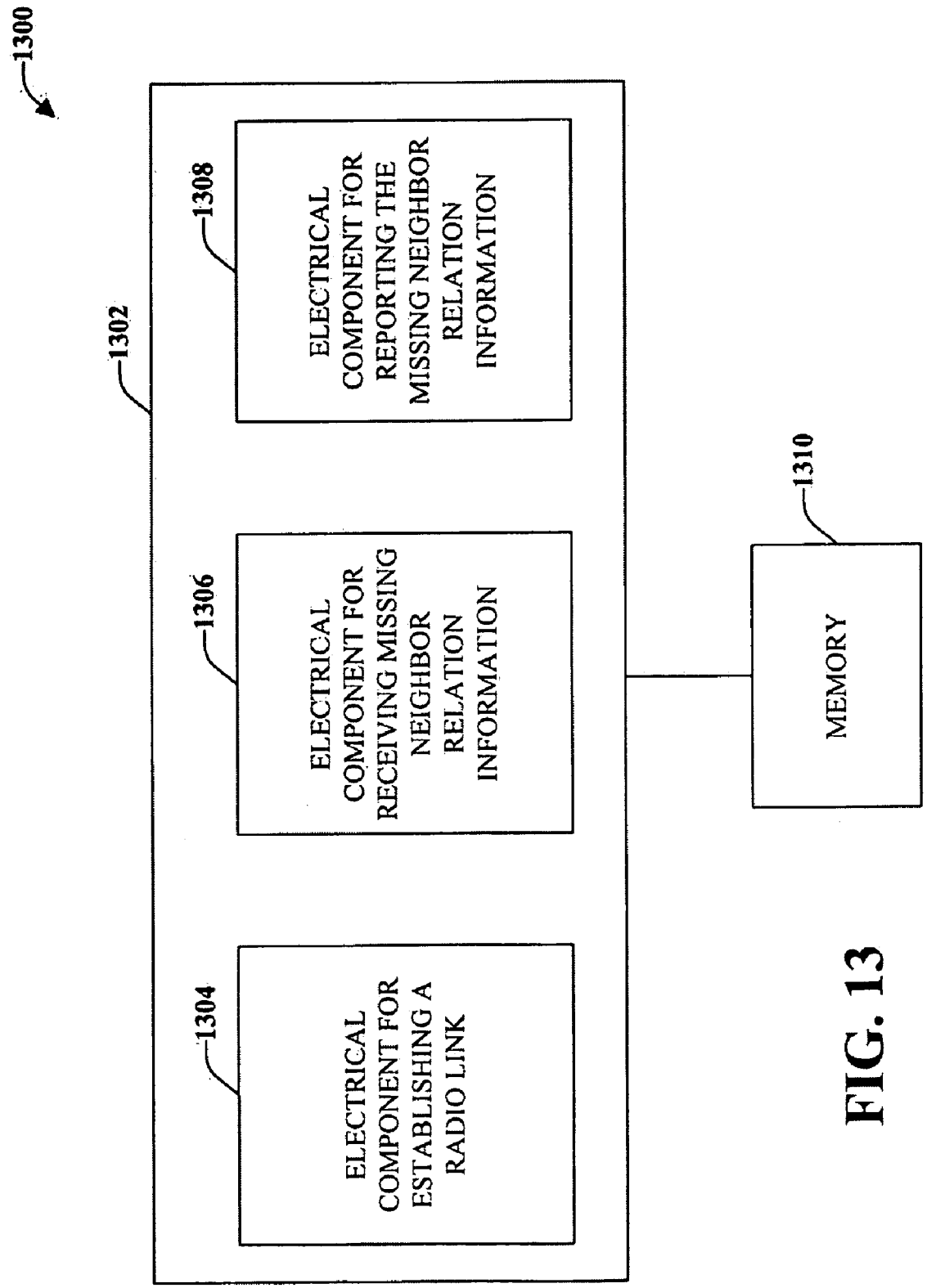
FIG. 13 illustrates an example system 130 that facilitates updates to access node neighbor lists, according to an aspect.

FIG. 13 illustrates an example system 1300 that facilitates updates to access node neighbor lists, according to an aspect. System 1300 can reside at least partially within a base station. System 1300 is represented as including functional blocks, which may be functional blocks that represent functions implemented by a processor, software, or combination thereof (e.g., firmware).

System 1300 includes a logical grouping 1302 of electrical components that can act separately or in conjunction. Included in logical grouping 1302 is an electrical component 1304 for establishing a radio link with an end node. Also included in logical grouping 1302 is an electrical component 1306 for receiving from the end node missing neighbor relationship information that is a function of a radio link failure between the end node and a first access node. Further, logical grouping 1302 includes an electrical component 1308 for reporting to a network entity the radio link failure information.

In accordance with some aspects, logical grouping 1302 can include an electrical component for receiving from the network entity an update to a neighbor list. The missing neighbor relationship is between a first access node and the access node that established the radio link with the end node. Additionally or alternatively, the received missing neighbor relationship is between a first access node and an intermediary access node that utilize different radio access technology.

System 1300 also includes a memory 1310 that retains instructions for executing functions associated with electrical components 1304, 1306, and 1308 or other components. While shown as being external to memory 1310, it is to be understood that one or more of electrical components 1304, 1306, and 1308 can exist within memory 1310.

It is to be understood that the aspects described herein may be implemented by hardware, software, firmware or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on, the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine-readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method for facilitating a neighbor list update on an access node based on a radio link failure, comprising:
    detecting a radio link failure with a first access node, wherein the radio link failure indicates a missing neighbor relation;
    starting a timer;
    establishing a second link with a second access node before expiration of the timer; and
    notifying the second access node of the missing neighbor relation.

2. The method of claim 1, wherein the timer is a $T_{valid\_infra\_relat}$ timer and the missing neighbor relation is between the first access node and the second access node.

3. The method of claim 2, wherein the first access node and the second access node utilize similar radio link technology.

4. The method of claim 1, further comprising:
    detecting expiration of the timer; and
    discarding information related to the radio link failure.

5. The method of claim 1, wherein the timer is a $T_{miss\_relat}$ timer, the method further comprising:
    starting a $T_{valid\_inter\_relat}$ timer of detection of the radio link failure;
    establishing a communication link with an intermediary access node before expiration of the $T_{valid\_inter\_relat}$ timer; and
    starting the $T_{miss\_relat}$ timer, wherein the missing neighbor relation is between the first access node and the intermediary access node and the first access node and second access node utilize similar radio link technology.

6. The method of claim 5, wherein the first access node and the intermediary access node utilize different radio link technology.

7. The method of claim 5, further comprising:
    detecting expiration of the $T_{valid\_inter\_relat}$ timer; and
    discarding information related to the radio link failure.

8. The method of claim 5, further comprising:
    detecting expiration of the $T_{miss\_relat}$ timer; and
    discarding information related to the radio link failure.

9. The method of claim 1, further comprises storing an identification of the first access node before detection of the radio link failure.

10. A wireless communications apparatus, comprising:
    a memory that retains instructions related to detecting a radio link failure with a first access node, starting a timer, establishing a second link with a second access node before expiration of the timer, and notifying the second access node of a missing neighbor relation, wherein the radio link failure indicates the missing neighbor relation; and
    a processor, coupled to the memory, configured to execute the instructions retained in the memory.

11. The wireless communication apparatus of claim 10, wherein the first access node and the second access node utilize similar radio link technology, the timer is a $T_{valid\_infra\_relat}$ timer, and the missing neighbor relation is between the first access node and the second access node.

12. The wireless communication apparatus of claim 10, the memory further retains instructions related to detecting expiration of the timer and discarding information related to the radio link failure.

13. The wireless communication apparatus of claim 10, wherein the timer is a $T_{miss\_relat}$ timer, the memory further retains instructions related to starting a $T_{valid\_inter\_relat}$ timer after detection of the radio link failure, establishing a communication link with an intermediary access node before expiration of the $T_{valid\_inter\_relat}$ timer, and starting the $T_{miss\_relat}$ timer, wherein the missing neighbor relation is between the first access node and the intermediary access node and the first access node and second access node utilize similar radio link technology.

14. The wireless communication apparatus of claim 10, the memory further retains instructions related to detecting expiration of a $T_{valid\_inter\_relat}$ timer or a $T_{miss\_relat}$ timer and discarding information related to the radio link failure.

15. A wireless communications apparatus that enables a neighbor list update on an access node as a function of a radio link failure, comprising:
    means for detecting a radio link failure with a first access node, wherein the radio link failure indicates a missing neighbor relation;
    means for starting a timer;
    means for establishing a second link with a second access node before expiration of the timer; and
    means for notifying, the second access node of the missing neighbor relation.

16. The wireless communications apparatus of claim 15, wherein the timer is a $T_{valid\_infra\_relat}$ timer and the missing neighbor relation is between the first access node and the second access node that utilize similar radio link technology.

17. The wireless communications apparatus of claim 15, wherein the timer is a $T_{miss\_relat}$ timer, the apparatus further comprising;
    means for starting a $T_{valid\_inter\_relat}$ timer after detection of the radio link failure;
    means for establishing a communication link with an intermediary access node before expiration of the $T_{valid\_inter\_relat}$ timer; and
    means for starting the $T_{miss\_relat}$ timer, wherein the missing neighbor relation is between the first access node and the intermediary access node and the first access node and second access node utilize similar radio link technology.

18. A computer program product, comprising:
    a non-transitory computer-readable medium comprising:
        a first set of codes for causing a computer to detect a radio link failure with a first access node, wherein the radio link failure indicates a missing neighbor relation;
        a second set of codes for causing the computer to activate a timer;
        a third set of codes for causing the computer to establish a second link with a second access node before expiration of the timer; and
        a fourth set of codes for causing the computer to notify the second access node of the missing neighbor relation.

19. The computer program product of claim 18, wherein the timer is a $T_{valid\_infra\_relat}$ timer and the missing neighbor relation is between the first access node and the second access node that utilize similar radio link technology.

20. The computer program product of claim 18, wherein the timer is a $T_{miss\_relat}$ timer, the computer-readable medium further comprising:
    a fifth set of codes for causing the computer to activate a $T_{valid\_inter\_relat}$ timer after detection of the radio link failure;
    a sixth set of codes for causing the computer to establish a communication link with an intermediary access node before expiration of the $T_{valid\_inter\_relat}$ timer; and
    a seventh set of codes for causing the computer to activate the $T_{miss\_relat}$ timer, wherein the missing neighbor relation is between the first access node and the intermediary access node and the first access node and second access node utilize similar radio link technology.

21. At least one processor configured to enable updates to an access node neighbor list based on radio link failures, comprising:
- a first module for detecting a radio link failure with a first access node, wherein the radio link failure indicates a missing neighbor relation;
- second module for starting a timer;
- a third module for establishing a second link with a second access node before expiration of the timer; and
- a fourth module for notifying the second access node of the missing neighbor relation.

22. The processor of claim 21, wherein the timer is a $T_{valid\_inter\_relat}$ timer and the missing neighbor relation is between the first access node and the second access node that utilize similar radio link technology.

23. The processor of claim 21, wherein the timer is a $T_{miss\_relat}$ timer, and further comprising:
- a fifth module for starting a $T_{valid\_inter\_relat}$ timer after detection of the radio link failure;
- a sixth module for establishing a communication link with an intermediary access node before expiration of the $T_{valid\_inter\_relat}$ timer; and
- a seventh module for starting the $T_{miss\_relat}$ timer, wherein the missing neighbor relation is between the first access node and the intermediary access node and the first access node and second access node utilize similar radio link technology.

24. A method for facilitating updates to neighbor lists in an access node as a function of a radio link failure, comprising:
- establishing a radio link with an end node;
- receiving from the end node missing neighbor relationship information that is a function of a radio link failure between the end node and a first access node, wherein the missing neighbor relationship information identifies a neighbor relationship between at least two access nodes; and
- reporting to a network entity the missing neighbor relationship information.

25. The method of claim 24, further comprising receiving from the network entity an update to a neighbor list, wherein the neighbor relationship is between a first access node and the access node that established the radio link with the end node.

26. The method of claim 24, wherein the neighbor relationship is between a first access node and an intermediary access node that utilize different radio access technology.

27. A wireless communications apparatus, comprising:
- a memory that retains instructions related to establishing a radio link with an end node, receiving from the end node missing neighbor relationship information that is a function of a radio link failure between the end node and a first access node, and reporting to a network entity the missing neighbor relationship information, wherein the missing neighbor relationship information identifies a neighbor relationship between at least two access nodes; and
- a processor, coupled to the memory, configured to execute the instructions retained in the memory.

28. The wireless communications apparatus of claim 27, wherein the memory further retains instructions related, to receiving front the network entity an update to a neighbor list, wherein the neighbor relationship is between a first access node and the access node that established the radio link with the end node.

29. The wireless communications apparatus of claim 27, wherein the neighbor relationship is between a first access node and an intermediary access node.

* * * * *